Oct. 15, 1968    M. S. KRIESEL    3,405,593
SEPARATION DEVICE
Filed April 18, 1966
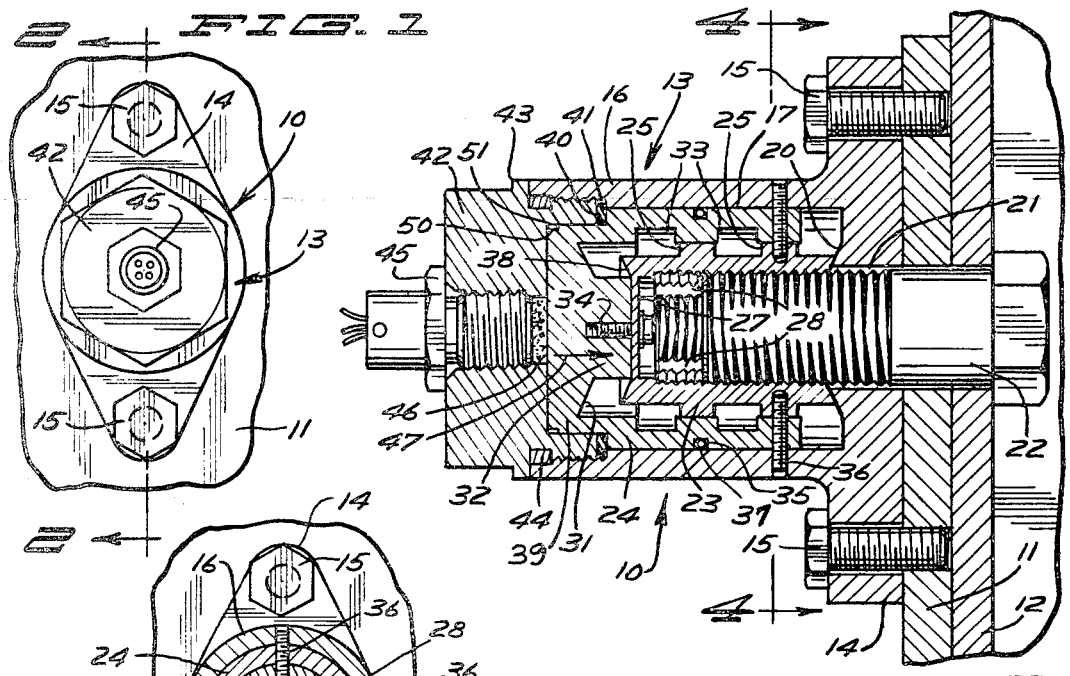
FIG. 1
FIG. 2
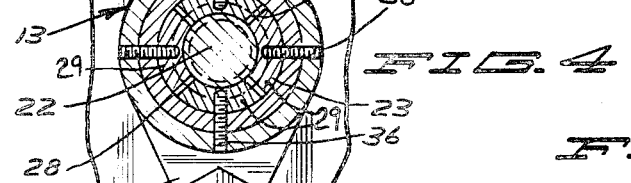
FIG. 4
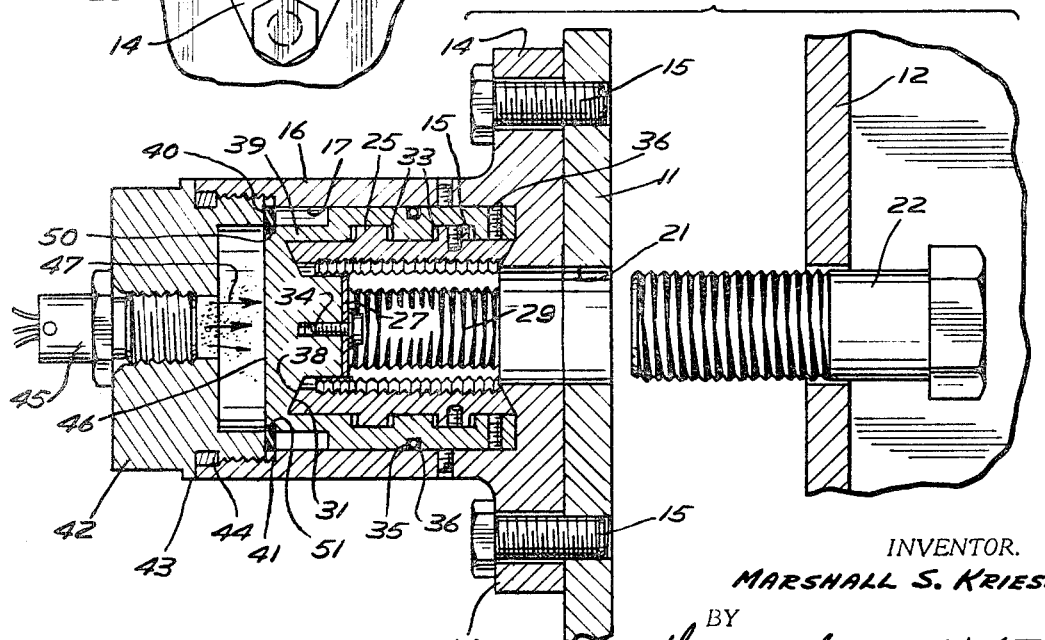
FIG. 3
INVENTOR.
MARSHALL S. KRIESEL
BY
Dugger Johnson & Westman
ATTORNEYS United States Patent Office 3,405,593
Patented Oct. 15, 1968

3,405,593
SEPARATION DEVICE
Marshall Sidney Kriesel, St. Paul, Minn., assignor to Aerospace Systems Company, Minneapolis, Minn., a corporation of California
Filed Apr. 18, 1966, Ser. No. 543,279
3 Claims. (Cl. 85—33)

ABSTRACT OF THE DISCLOSURE

An explosively actuated releasable fastening assembly comprising a housing that has an interior chamber in which a sleeve type piston is mounted. A nut or similar fastening device is mounted inside the piston and is comprised of several sections that are normally held together by a frangible member. When the nut is held together, a bolt can be threaded into it and the nut will retain the bolt from axial movement. When the bolt is to be released, a charge is detonated which causes the piston to move from a normal position to a second position wherein a boss on the piston will break the frangible member permitting the nut to separate into segments, and tapered ramp surfaces on the piston and on the housing will force the nut to move radially outwardly causing the threads on the nut to disengage the threads on the bolt and thereby releasing the bolt.

---

The present invention has relation to separation devices and more particularly to a device which will separate upon actuation of an explosive device, and which is self-contained so that no fragments are scattered.

The present device is, as shown, an explosive separation unit designed for use in the separation or release of two members or components. In particular, it finds usage in aircraft applications where it may be necessary to jettison one member from another.

The device includes an outer housing in which a segmented nut is mounted. The segments on the nut are held together by a frangible or rupturable member. When an explosive charge is detonated, an internal piston is moved to break the frangible member to release the nut segments. The piston is provided with ramp like surfaces that will force the nut segments radially outwardly so that they no longer engage the threads of a bolt threaded into the nut. This will release the bolt and cause separation of any items held by the bolt.

It is an object of the present invention to present a device which can be remotely released to permit two normally attached members to separate.

It is a further object of the present invention to present an explosive separation device that presents no danger to people in the surrounding area due to fragmentation of the nut.

It is another object of the present invention to present a separation device comprising a nut into which a bolt can be threaded and which is segmented so that upon actuation of an explosive, the segments will be forced apart to release the bolt.

It is still another object of the present invention to present a separation device wherein a segmented nut is held together by a frangible slug at one end of the nut and which is engaged and broken by a piston that is actuated upon detonation of an explosive charge.

It is a still further object of the present invention to present an explosively actuated separation nut wherein the nut segments are normally held from radial movement by surfaces on a piston sleeve, and upon actuation of an explosive, the piston sleeve moves to position wherein the nut segments are forced to move substantially radially outwardly.

Other objects are inherent in the specification and will become apparent as the description proceeds.

In the drawings:
FIG. 1 is an end view of an explosive separation device made according to the present invention shown installed on a pair of separable members;
FIG. 2 is a sectional view taken as on line 2—2 in FIG. 1;
FIG. 3 is a sectional view taken as on substantially the same line as FIG. 2 showing the separation device after it has been actuated to release a bolt to which it is attached; and
FIG. 4 is a sectional view taken as on line 4—4 in FIG. 2.

Referring to the drawings the numerals of reference thereon, an explosive separation device assembly illustrated generally at 10 is utilized for attaching a first member 11 and a second member 12 together. In the form shown, the device is an explosive nut that has a housing 13 which includes a base portion 14 that is attached to the first member 11 with a pair of cap screws 15, which pass through provided holes in the base portion and are threaded into the first member 11. The housing 13 has an elongated body 16 which, as shown, has a center interior chamber 17. The chamber 17 has an interior end surface 20 which is adjacent to the base portion 14. The interior end surface 20, as shown, surrounds an opening 21 through which a bolt 22 can pass. The surface 20 is conically shaped, as shown, adjacent the opening 21 for the bolt. The chamber 17 is used to house a piston sleeve 24 which has a chamber in which an integral segmented nut body or separation device body 23 is positioned. The piston sleeve 24 is slidably fitted into the chamber 17. The nut body-piston sleeve assembly is surrounded by the main housing except at the open end of the chamber which is closed with a cartridge housing 42.

As shown, the nut body is perhaps best visualized as being a tube having a pair of annular external ribs 25, 25 which are spaced on the outside thereof, and having a threaded inner surface 26. The tube is plugged at its outer end with a small slug or frangible element 27 which is integral with the tube wall. There are four longitudinally extending slits or grooves 28 through the wall of the nut body. These slits extend the entire length of the nut body and form thereby four nut body segments 29. These can perhaps best be seen in FIG. 4. The only thing that holds these segments together is the slug 27 (and the walls of the chamber in the piston which normally prevent separation). As shown, both the inner and outer end surfaces of the nut body are conically tapered. The inner surface mates with the surface 20 on the end of the chamber 17, and the outer surface 38 is tapered the same way and is adapted to engage and meet with the surface 31 which is defined in the interior end of the piston sleeve 24.

The piston sleeve 24 is also tubular and has one closed end as shown. The conical surface 31 is defined at the closed end of the chamber and surrounds a boss 32 which extends toward the open end. The nut body slides inside the cavity defined by the outer wall of the piston sleeve. A pair of annular internal grooves 33 are formed on the interior surface of the piston sleeve and these define ribs or lugs which mate with the ribs 25 of the nut body. Thus, when the nut body is in its position as shown in FIG. 2, ribs 25 are resting against the interior surface of the piston sleeve and the grooves 33 are immediately adjacent these ribs. The nut body segments cannot separate when the nut is in this position.

In order to hold the nut and piston sleeve in assembled position, a small cap screw 34 is passed through the slug 27 and threaded into the end of boss 32. In this position, the nut is held within the sleeve, and the boss 32 is coaxial with the opening in the interior of the nut body. The boss is just slightly smaller in diameter than the opening through the nut body.

An outer groove 35 in the piston sleeve houses an "O" ring 37 to provide a gas pressure seal for the explosive actuation of the device. The piston-nut body assembly is slidably mounted into the chamber 17 to position where the inner end surface of the nut abuts against surface 20. Four shear set screws 36 are passed through the wall of the housing body 16, through the wall of the piston sleeve and into the rib adjacent the inner end of the nut body. Thus the piston sleeve is held within the chamber 17 in proper position.

A retaining ring 40 is expanded over the outer end portion 39 of the piston sleeve and is abutted against a shoulder 41 in the interior of the body 16. The ring 40 also abuts against an annular shoulder defined in the piston sleeve as well. Once in this position with the retaining ring 40 expanded around the end portion of the piston sleeve and abutting against shoulder 41, a cartridge housing 42 is threadably mounted into the end of the body 16. The cartridge housing 42 has a flange 43 that abuts against the end of the body 16. A slight clearance is left between the inner end of the cartridge housing and the retaining ring 40. An annular "O" ring 44 is provided to seal the cartridge housing with respect to the body 16 when it is threaded into position.

The cartridge housing 42 houses a squib 45 which is an electrically actuated explosive device that will create a controlled explosion inside the body 16 as will be more fully explained. Electrically actuated squibs are well known in the art and are commercially available. The means for actuating the squib are not shown and these controls are also conventional.

As shown, with the assembled nut mounted onto the member 11, the bolt 22 is passed through provided openings in second member 12, first member 11, and the opening 21 in the main housing 13. The bolt 22 is then threaded into the nut body as shown until the members 11 and 12 are held securely together. The bolt could be used for mounting an escape hatch on a space ship, or the canopy of an aircraft or similar device. Once the unit is securely mounted together, then the two members 11 and 12 will be held until it is desired to release the members from each other. At that time, the following sequence will take place.

First, the squib 45 will be fired, releasing gas pressure from the explosive charge into the cartridge housing opening and against the outer end surface 46 of the piston sleeve 24. This will force the piston sleeve in direction as indicated by arrow 47. The shear screws 36 will shear permitting the sleeve to move rearwardly with respect to the housing 16 and the nut body 23. Then, the force from the pressure inside the cartridge housing will cause the boss 32 to punch out the slug 27 of the segmented nut body. When this occurs, the nut body will separate into its individual segments. The piston sleeve continues to travel in direction as indicated by arrow 47 until the surface 31 mates with the tapered outer end surface 38 of the nut body segments. As previously explained, there are now four segments to the nut rather than an integral nut, and the resulting radial outward force caused by the conical surface will force the nut segments outwardly.

By this time the piston sleeve has traveled rearwardly toward position as shown in FIG. 3 a sufficient distance to bring the grooves 33 on the interior of the piston sleeve into alignment with the ribs 25 on the nut. Thus the radial outward force on the nut will cause the nut segments to be moved outwardly a sufficient distance to clear the outside diameter of the threads on bolt 22. This means that the bolt will be free to separate from the nut and the unit will come apart as shown in FIG. 3. In other words, members 11 and 12 will separate.

It should be noted that when the piston sleeve reaches its position as shown in FIG. 3, the retaining ring 40, which was resiliently expanded to fit over the end portion 39 of the piston sleeve will spring inwardly and fit down against a small annular notch 50 right at the end of the piston sleeve. The annular notch 50 forms a shoulder 51, and the ring 40 abutting against the shoulder 51 prevents the piston sleeve from moving back out in direction opposite that indicated by arrow 47 and insures that the piston sleeve will be held in position which will keep the nut segments separated a sufficient distance to permit the bolt 22 to easily come out of the nut.

In order to reuse the main housing 13, the cartridge body is removed, the piston sleeve is removed, and the nut segments taken out. A new piston sleeve and nut body can then be inserted into the chamber 17, and a new squib 45 threaded into the cartridge chamber, and the unit reused.

The piston sleeve can be reused by merely removing the portion of the shear screws that remain in the sleeve.

The piston sleeve has a very short stroke from its initial position to its fully actuated position, thus making the release practically instantaneous. The actuation time varies between 7 and 10 milliseconds from the time the squib is ignited until the unit separates. The utilization of high strength steel parts give great load carrying capacity and by proper selection of the other materials the piston will never freeze inside the housing.

What is claimed is:

1. An explosive separation device comprising a housing, said housing having a first interior chamber, a piston within said interior chamber and movable in axial direction between first and second positions within the chamber, said piston having an interior piston chamber, a tubular nut body mounted in said interior piston chamber, said nut body being made up of a plurality of segments, a frangible member comprising a small slug closing one end of said tubular nut body and holding the segments together, means to permit a bolt to be threaded into the nut body, a boss on said piston positioned to engage said slug and break said slug away from the segments to permit separation of said nut segments to release said bolt whenever said piston moves from its first to its second position, an outwardly tapering ramp like surface on said piston in alignment with said nut body, said ramp like surface being adapted to engage a first end portion of said tubular nut body and move the segments thereof radially outwardly when the piston moves from its first to its second position, means to seal said piston with respect to the interior chamber of said housing, and explosive means to provide a gas pressure in the interior of said first chamber to act against said piston to move it from its first to its second position.

2. The combination as specified in claim 1 wherein said nut body has a pair of ribs around the periphery thereof and wherein said interior piston chamber is cylindrical, the interior surfaces defining said piston chamber engaging the outer surface of the ribs on said nut body when the piston is in its first position, the interior piston chamber being provided with a pair of internal grooves of size to receive said ribs, said grooves being aligned with said ribs when said piston moves to its second position.

3. The combination as specified in claim 1 and a second frangible member passing through the wall of said housing, through the wall of said piston, and into the nut body to hold the housing piston and nut body together when the piston is in its first position.

(References on following page)

References Cited

UNITED STATES PATENTS

| | | | |
|---|---|---|---|
| 3,334,536 | 8/1967 | Armstrong | 85—33 |
| 2,432,933 | 12/1948 | Peterson | 85—7 |
| 2,524,481 | 10/1950 | Schermuly et al. | 85—33 |
| 3,053,131 | 9/1962 | Stott. | |
| 3,147,663 | 9/1964 | Brown. | |
| 3,169,443 | 2/1965 | Stott. | |
| 3,204,515 | 9/1965 | Dickie et al. | |
| 3,233,499 | 2/1966 | Gale. | |
| 3,253,653 | 5/1966 | Layne. | |
| 3,262,354 | 7/1966 | Webb. | |

MARION PARSONS, JR., *Primary Examiner.*